United States Patent [19] [11] 4,103,283
Lee [45] Jul. 25, 1978

[54] TIRE INFLATION MONITORING SYSTEM
[75] Inventor: Maw-Huei Lee, Brecksville, Ohio
[73] Assignee: The B. F. Goodrich Company, Akron, Ohio
[21] Appl. No.: 730,052
[22] Filed: Oct. 6, 1976
[51] Int. Cl.² .............................................. B60C 23/00
[52] U.S. Cl. .................................... 340/58; 200/61.25
[58] Field of Search ............ 340/58; 200/61.22, 61.25, 200/61.26

[56] References Cited
U.S. PATENT DOCUMENTS 2,894,246  7/1959  Graffenried ...................... 340/58 X
3,602,884  8/1971  Brumbelow .......................... 340/58

Primary Examiner—Alvin H. Waring
Attorney, Agent, or Firm—James R. Lindsay

[57] ABSTRACT

A monitoring system for motor vehicles that produces a warning signal when the pressure within a tire changes to an unacceptable pressure. The system includes a sensor unit attached on the wheel on which the tire to be monitored is mounted and a second component secured to the vehicle body. The unit mounted to the vehicle body contains a coil wound on a core that is positioned at a location so that as the wheel of the vehicle revolves a second coil wound on a core that forms a part of the sensor unit comes into close proximity to the coil secured to the vehicle body during each rotation of the wheel. When the pressure in the tire changes from a "normal" pressure, a harmonious balance between the two components of the system is disturbed resulting in the triggering of a warning mechanism that alerts the operator of the vehicle that the air pressure in the tire has reached an unacceptable level.

9 Claims, 7 Drawing Figures

TIRE INFLATION MONITORING SYSTEM

BACKGROUND OF THE INVENTION

The present invention relates to a monitoring system for motor vehicles that produces a warning signal when the pressure within a tire changes to an unacceptable level.

As is well known, the useful life of a tire is materially affected if the tire is operated over a prolonged period of time in an improperly inflated condition. Driving on an underinflated tire causes excessive flexing of the sidewalls of the tire that results in an inordinate buildup of heat in the tire and even may result in the tire becoming so hot that it will burst into flame. If the pressure in the tire falls to a sufficiently low level that the vehicle steers sluggishly, the operator probably will become aware that something is wrong with the vehicle and will stop and inspect the tires. However, if the degree of underinflation is only moderate, the operator of the vehicle may be become conscious of the underinflated condition of the tire until after the tire has been materially damaged.

When the vehicle is driven for prolonged periods of time in hotter climates, the hotter operating temperatures may cause the pressure within the tire to be increased to an objectionable high level at which excessive tread wear will occur and even may build up to such a high pressure that rupturing of the tire may result.

Various devices previously have been proposed for monitoring the pressure of a tire while in service and for producing a warning signal when the pressure of the tire changes from an acceptable level. Such devices usually have a sensor unit mounted on the wheel and an alarm component associated with the vehicle body and employ a purely electrical system or a combination of an electrical system and a mechanical system. A number of such systems depend upon a physical connection between the rotating wheel on which the sensor component is mounted and the alarm portion of the system associated with the vehicle body. Such physical connections, for example sliding electrical contacts, usually have not been found to be entirely satisfactory, however, since they can be rendered ineffective as a result of exposure to inclement weather or rough road conditions or merely because of wear of the contact surfaces after a prolonged period of use. Therefore, it is preferable that a system for monitoring tire inflation not rely on a physical connection for coupling the sensor circuit of the system mounted on the vehicle wheel with the alarm circuitry associated with the vehicle body. A number of monitoring systems that do not rely on a physical coupling between the sensor circuit of the system and the alarm circuitry have been suggested, some of which are described in U.S. Pat. Nos. 2,894,246; 3,093,812; 3,249,916; 3,374,460 and 3,602,884.

Many of the monitoring systems which previously have been proposed are objectionably complicated in their circuitry which not only materially adds to the initial cost of the system but also increases the number of potential sources for component failure. Use of circuitry that includes components within the sensor unit mounted on the wheel that require manual adjustment or "setting" to permit the monitoring system to function properly is objectionable since operation of the vehicle over rough roads may cause the component to be jolted out of proper adjustment and result in a malfunctioning of the system. Accordingly, it is desirable that the monitoring system be as simple in circuitry as possible with no variable components that require manual "setting" to permit the system to operate satisfactorily.

SUMMARY OF THE PRESENT INVENTION

The present invention provides a reliable system for monitoring the inflation of a tire while it is in service and which produces a warning signal to advise the operator of the vehicle when the pressure within the tire changes to an unacceptable level. The system includes a tire pressure sensor unit having a wire coil wound around a core connected in series with a pressure indicator responsive to a change in pressure to an unacceptable level of the air within the tire being monitored. The sensor unit is mounted on the wheel being monitored and is arranged so that as the wheel rotates the coil of the sensor unit passes during each rotation of the wheel in close proximity to a second coil wrapped around a core and mounted to the vehicle body. The second coil is a component of a circuit that is in electrical resonance at the frequency at which the system operates. The number of turns of wire in the coil in the wheel-mounted sensor unit is selected so that the circuit of the sensor unit when the pressure indicator is "open" is in electrical resonance with the circuit in electrical resonance mounted on the vehicle body.

In the operation of the system, if the pressure in the tire being monitored changes from a "normal" pressure to an unacceptable pressure level at which the pressure indicator in the circuit of the sensor unit is responsive, the voltage across the coil in the sensor unit circuit as it passes in close proximity to the coil mounted on the vehicle body will be different from that occurring across the coil before the pressure change took place. The voltage change, in turn, will change the voltage previously experienced across the coil on the vehicle body and will trigger the warning signal to indicate an unacceptable inflation condition of the tire.

DESCRIPTION OF THE DRAWINGS

The invention will be more fully understood by reference in the following description and to the drawings in which.

DETAILED DESCRIPTION OF THE INVENTION

Figure 1:
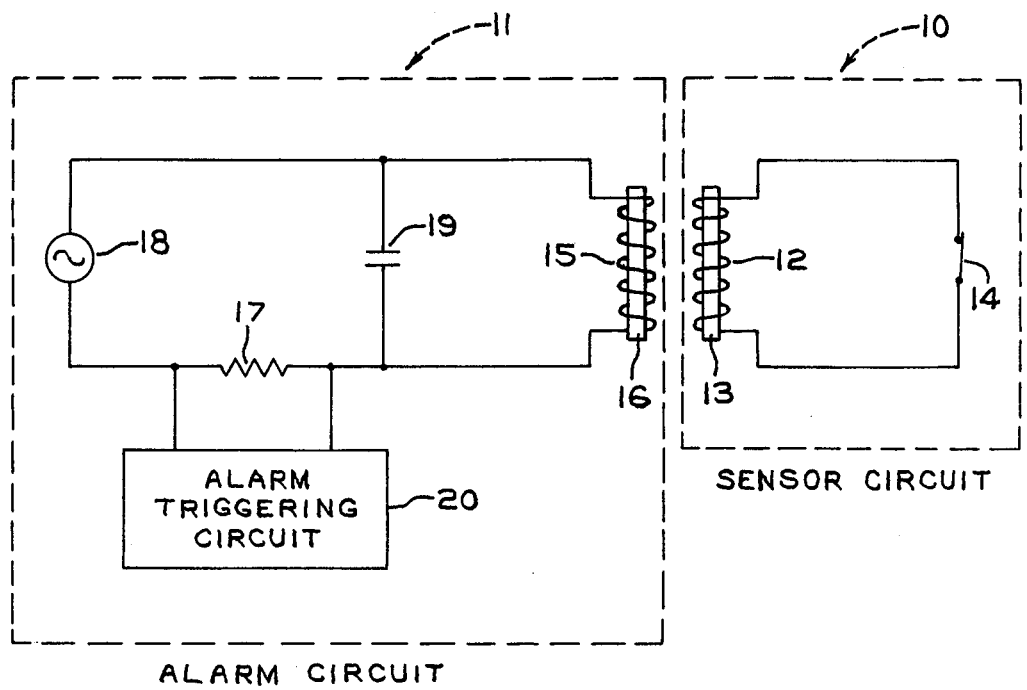
FIG. 1 shows a block diagram of one embodiment of the invention.

The tire inflation monitoring system depicted in FIG. 1 includes a sensor circuit 10 and an alarm circuit 11 which is physically unattached to sensor circuit 10. The sensor circuit 10 contains a coil 12 wound on core 13 and serially connected to a pressure switch 14 which normally is maintained "closed" as long as the pressure within the tire being monitored is at a prescribed "normal" pressure but which becomes "open" in response to a drop in pressure within the tire below the responsive pressure of the pressure switch 14. The alarm circuit 11 includes a coil 15 wound on core 16 and serially connected with resistor 17 and a generating source of constant frequency alternating current such as oscillator 18. A condenser 19 is connected across the terminals of coil 15 and an alarm triggering circuit 20 (which may consist of the circuitry shown in FIG. 6 and which will be described below in greater detail) is connected across the terminals of resistor 17.

Figure 2:
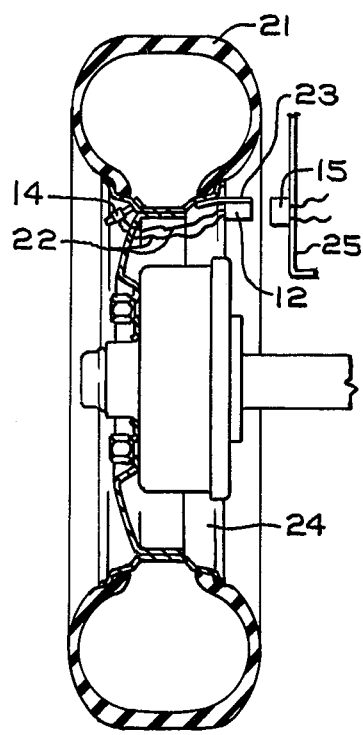
FIG. 2 shows the sensor unit of the embodiment of FIG. 1 mounted on the wheel of a vehicle with the coil of the alarm circuit mounted to the vehicle body in a position relative to the sensor unit so that the coil of the sensor unit passes in close proximity to the coil of the alarm circuit during each rotation of the wheel.

The sensor circuit 10 is attached to the wheel of the vehicle which is being monitored so that coil 12 rotates with the wheel as the wheel rotates. FIG. 2 shows one arrangement for mounting sensor circuit 10 to the wheel of the vehicle. As depicted in FIG. 2, the pressure switch 14 forms a part of the valve assembly of the tire 21 and is connected by wires 22,22 to coil 12 that is secured by bracket 23 to the wheel rim 24 on which tire 21 is mounted. Coil 15 of alarm circuit 11 is securely attached to the vehicle body 25 at a location so that, as the wheel rotates, coil 12 attached to wheel rim 24 will pass in close proximity to coil 15 attached to the vehicle body 25 (preferably within a distance of about 2 inches) during each rotation of the wheel.

Cores 13 and 16 around which coils 12 and 15 respectively are wound may be made either of powdered ferromagnetic material or powdered ferrimagnetic material. An example of a powdered ferromagnetic material is pure carbonyl iron powder. The powdered ferrimagnetic materials from which powdered cores usually are made include powdered ferrites of the spinel, magnetoplumbite, or garnet types.

The circuit that includes coil 15, resistor 17 and condenser 19, the "primary circuit," is designed to be tuned to electrical resonance at the frequency of the signal generated by oscillator 18. The condition of resonance can be achieved by a proper selection of coil 15 and condenser 19. For example, after selecting a particular condenser 19 for use in the circuit, the number of turns of wire in coil 15 will need to be chosen that will produce the desired resonant condition at the frequency of the signal emitted by oscillator 18. The correct number of turns of wire to be used in coil 15 can be determined by varying the number of turns of wire in the coil until the voltage across the coil is at a maximum (indicating that the circuit is in electrical resonance).

Also, the "secondary circuit" (which includes coil 12 and pressure switch 14) is designed so that it exhibits electrical resonance at the frequency of the signal generated by oscillator 14 when the pressure switch 14 is open and coil 12 is moved in close proximity to coil 15 as the wheel rotates. The desired condition of electrical resonance in the "secondary circuit" is achieved by the proper selection of the ratio of the number of turns of wire in coil 12 to the number of turns of wire in coil 15. In order to determine the number of turns of wire to be used in coil 12 to produce the desired condition of resonance, the number of turns of wire in the coil 12 are varied and the voltage across coil 12 measured for the varying number of turns of wire in the coil 12 as coil 12 is moved in close proximity to coil 15 with the "primary circuit" tuned to resonance at the frequency at which the monitoring system will operate and with the "secondary circuit" open until the number of turns of wire in coil 12 that produces the greatest voltage across coil 12 is determined. The number of turns of wire in coil 12 that produces the greatest voltage across coil 12 is the number of turns of wire that produces electrical resonance in the "secondary circuit" at the frequency of the signal emitted by oscillator 18. Alternatively, with the "primary circuit" tuned to resonance and the "secondary circuit" open the number of turns of wire in coil 12 are varied and the voltage across the condenser 19 measured (for each of the varying number of turns of wire in coil 12) as the coil 12 passes in close proximity to coil 15 until the voltage across condenser 19 reaches a minimum value (indicating that the "secondary circuit" is tuned to resonance at the frequency of the signal emitted by oscillator 18). The condition of electrical resonance in the "secondary circuit" can be attributed to the "effective distributed capacitance" characteristic exhibited by coil 12. When the "primary circuit" is tuned to resonance at the frequency of the signal generated by oscillator 18 and the number of turns of wire in coil 12 is selected to produce electrical resonance at the same frequency in the "secondary circuit" (with pressure switch 14 open), the "primary circuit" and the "secondary circuit" are considered to have "matched resonance" and the passing of coil 12 in close proximity to coil 15 will produce a noticeable change in voltage across the coils as long as pressure switch 14 is open.

Figure 3:
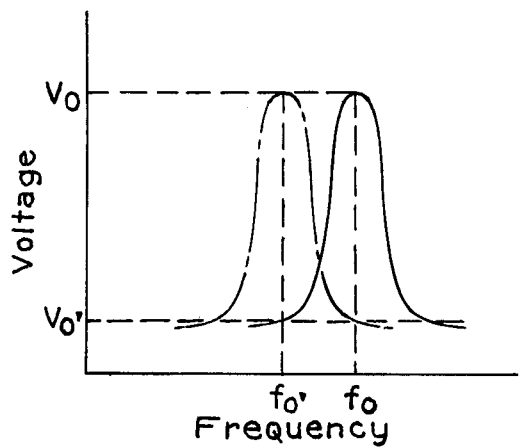
FIG. 3 illustrates the change of voltage across the coil of the alarm circuit of the embodiment shown in FIG. 1 during the period that the coil of the sensor unit passes in close proximity to the coil of the alarm circuit when the sensor circuit is "open"

During operation of the vehicle, it will be appreciated that during each rotation of the wheel with which the monitoring system is associated, coil 12 mounted on wheel rim 24 will pass in close proximity to coil 15 mounted on the vehicle body 25. As long as the pressure in tire 21 exceeds the pressure at which the pressure switch 14 responds, the pressure switch will remain closed and, since coil 12 is not in resonance with its "effective distributed capacitance" at the operating frequency of oscillator 18, the passing of coil 12 in close proximity to coil 15 will have no noticeable effect on the voltage across coil 15. However, if the pressure in tire 21 drops below the pressure at which pressure switch 14 is responsive, pressure switch 14 will "open" breaking the electrical circuit in which coil 12 is connected. The open circuit resulting from movement of pressure switch 14 to an "open" condition causes the "secondary circuit" to be in resonance with its "effective distributed capacitance" and in "matched resonance" with the "primary circuit" resonance. As a further result of the open circuit caused by the "opening" of pressure switch 14, the resonance frequency of the "primary circuit" during the time coil 12 passes in close proximity to coil 15 as the wheel rotates changes. The aforementioned change of resonant frequency of the "primary circuit" from frequency $f_o$ to frequency $f_o'$ and the resulting drop in voltage across coil 15 from a voltage of $V_o$ when pressure switch 14 is closed to a voltage of $V_o'$ when pressure switch 14 opens is illustrated in FIG. 3. As is indicated by the resonance curves in FIG. 3, when the tire 21 is properly inflated and pressure switch 14 is "closed," the voltage across coil 15 with the "primary circuit" in resonance at frequency $f_o$, is at maximum voltage amplitude, $V_o$ (shown by solid line curve). However, when the pressure in tire 21 drops sufficiently and pressure switch 14 becomes "open," the resonant frequency of the "primary circuit" is now changed to a new resonant frequency of $f_o'$ during the period that coil 12 passes in close proximity to coil 15 (shown by dot and dash curve). Nevertheless, the frequency of the signal being generated by oscillator 18 remains at $f_o$ and, therefore, the voltage across coil 15 drops to voltage amplitude $V_o'$, as illustrated in FIG. 3. The drop in voltage across coil 15 (from $V_o$ to $V_o'$) is "noticed" by the alarm triggering circuit 20 of the monitoring system and signals a warning to the operator of the vehicle that the pressure in tire 21 has dropped below an acceptable pressure.

Figure 6:
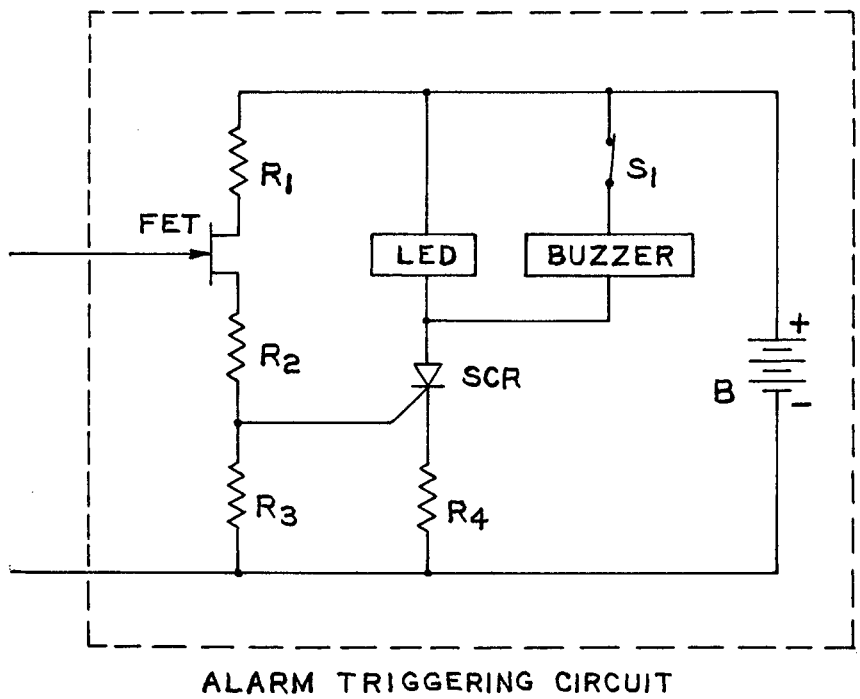
FIG. 6 shows a circuit diagram illustrating an alarm triggering circuit which may be used with the embodiment of the invention shown in FIG. 1.

The alarm triggering circuit 20 may be any alarm circuit responsive to a variation in voltage. One such alarm circuit is illustrated in FIG. 6 and is composed of a field effect transducer (FET), resistors $R_1$, $R_2$, $R_3$ and $R_4$, a silicon controlled rectifier (SCR), a light emitting diode (LED), a buzzer, switch $S_1$ and the vehicle battery B. When the pressure in the tire 21 is within the "normal" range and pressure switch 14 of the monitoring system shown in FIG. 1 is in the "closed" position, the voltage across resistor 17 of alarm circuit 11 is of small magnitude and insufficient to produce a signal of large enough magnitude to trigger the SCR. However, if the pressure in tire 21 falls to the pressure at which pressure switch 14 responds (the pressure switch 14 having been selected to respond at a pressure at which an underinflation condition begins), pressure switch 14 opens and the voltage across resistor 17 increases sufficiently (because of the drop in voltage across coil 15 to $V_o'$) during the period that coil 12 passes in close proximity to coil 15 as the wheel rotates to cause a signal of sufficient magnitude to be produced to trigger the SCR. The buzzer and LED then signal audible and visual warnings to the operator of the vehicle that the pressure within tire 21 has dropped below an acceptable level The buzzer will continue to sound until the circuitry of the alarm triggering circuit 20 is broken by manually "opening" switch $S_1$.

The frequency at which the monitoring system functions is determined by the frequency of the signal generated by oscillator 18. Although the monitoring system can be designed to operate at relatively low frequencies, the number of turns of wire in coils 12 and 15 increase as the frequency at which the system operates is reduced. As a consequence, the monitoring system normally is designed to operate at a frequency above about 100 kilocycles per second.

It will be appreciated that a separate monitoring system will be used for each wheel to be monitored if the operator is to be informed of the particular wheel on which loss of tire pressure has occurred. Also, a visual light alone or a buzzer alone may be used in alarm stage 29 of the alarm triggering circuit 20, instead of both a buzzer and a visual light.

Figure 4:
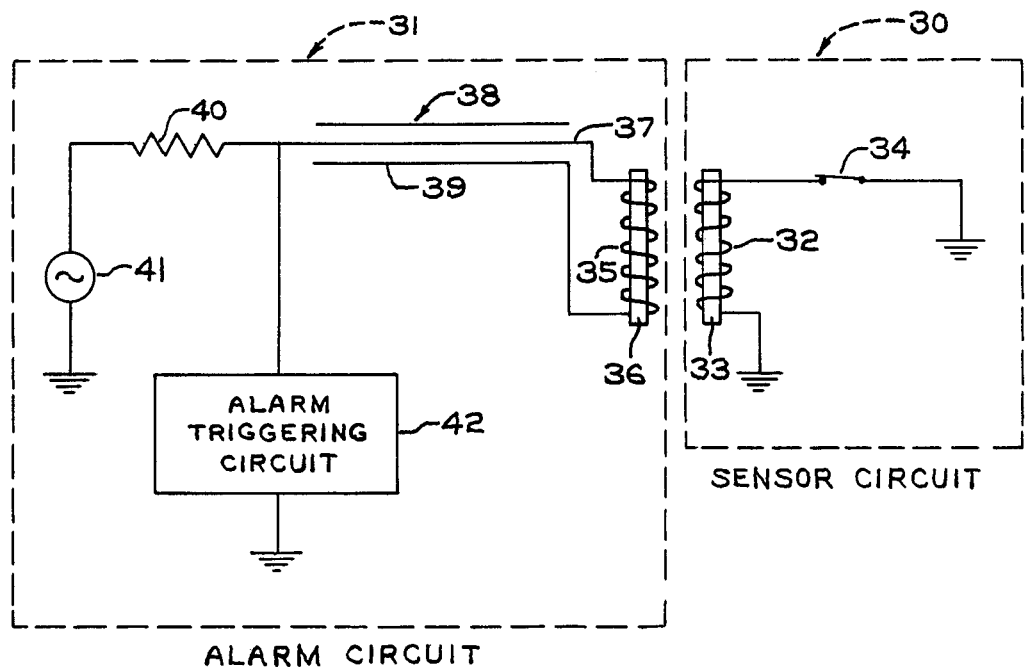
FIG. 4 shows a block diagram of a second embodiment of the invention.

In the embodiment shown in FIG. 4, the monitoring system includes a sensor circuit 30 and an alarm circuit 31 physically unattached to sensor circuit 30. Sensor circuit 30 includes a coil 32 wound on core 33. One terminal of coil 32 is connected to ground while the other terminal of coil 32 is connected in series with pressure switch 34 which is maintained closed as long as the pressure within the tire being monitored is above the pressure at which the pressure switch 34 is responsive and which becomes "open" when the pressure within the tire drops below the response pressure of the switch.

The pressure at which pressure switch 34 responds is chosen to correspond with the tire pressure at which underinflation begins. The pressure switch 34 in turn is "grounded" to the wheel. The coil 32 wound on core 33 may be attached to the wheel rim of the wheel being monitored as described above and pressure switch 34 may form a part of the valve assembly of the tire being monitored as described above. Alarm circuit 31 includes a coil 35 wound on a core 36. One terminal of coil 35 is connected in series to the central conductor 37 of coaxial cable 38 with the other terminal of coil 35 serially connected to the metal tubular conductor (or shield) 39 of coaxial cable 38. The central conductor 37 in turn is connected serially to resistor 40 which is connected serially to oscillator 41 which is connected to ground. One terminal of an alarm triggering circuit 42 (which may be the alarm triggering circuitry shown in FIG. 7) is connected at the juncture of resistor 40 and central conductor 37 of coaxial cable 38. The other terminal of alarm triggering circuit 42 is connected to ground.

Cores 33 and 36 around which coils 32 and 35 respectively are wound, like cores 13 and 16 of the embodiment shown in FIG. 1, may be made either of a powdered ferromagnetic material or a powdered ferrimagnetic material.

Coil 35 wound on core 36 is attached to the vehicle body so that as the wheel on which sensor circuit 30 is mounted rotates, coil 32 of sensor circuit 30 will pass in close proximity to coil 35 of alarm circuit 31.

Coaxial cable 38 provides the necessary capacitance in the alarm circuit 31 of the monitoring system shown in FIG. 4, and in this respect provides the function of condenser 19 of the monitoring system shown in FIG. 1.

The circuitry that includes coil 35 and coaxial cable 38, the "primary circuit," is tuned to electrical resonance at the frequency of the signal being emitted by oscillator 41. The condition of resonance can be achieved by a selection of a coil 35 having the proper number of turns of wire and a coaxial cable 38 of proper length to provide the needed capacitance. With a finite length of coaxial cable 38, one can determine the number of turns of wire that must be in coil 35 to provide the desired condition of electrical resonance by varying the number of turns of wire in the coil until resonance is reached.

The number of turns of wire in coil 32 of the "secondary circuit" (which includes coil 32 and pressure switch 34) is selected so that the "secondary circuit" with pressure switch 34 "open" exhibits electrical resonance at the frequency of the signal being emitted by oscillator 41. The proper number of turns of wire for use in coil 32 to produce the desired resonant condition can be determined in the same manner as described hereinbefore with regard to determining the proper number of turns of wire for coil 12 of the sensor circuit shown in FIG. 1. The "primary circuit" and the "secondary circuit" then will be in "matched resonance" as coil 32 passes in close proximity to coil 35 as the wheel rotates and a noticeable change in voltage across coil 35 will be noticed as the two coils pass in close proximity to each other during each rotation of the wheel as long as pressure switch 34 remains "open."

The monitoring system comprised of sensor circuit 30 and alarm circuit 31 works in essentially the same manner as sensor circuit 10 and alarm circuit 11 of the monitorning system shown in FIG. 1. As long as the pressure within the tire being monitored remains above the pressure at which pressure switch 34 responds, the voltage across coil 35 remains constant. However, when the pressure in the tire being monitored drops below the pressure at which pressure switch 34 responds, pressure switch 34 "opens" and in so doing causes the "secondary circuit" to become an open circuit and in electrical resonance with the "primary circuit." As a result, the voltage across coil 35 is significantly reduced during the period that coil 32 passes in close proximity to coil 35 as the wheel rotates. The decreased voltage amplitude across coil 35 during the period that coil 32 passes in close proximity to coil 35 is communicated to the alarm triggering circuit 42 and causes the triggering of the warning alarm.

Figure 7:
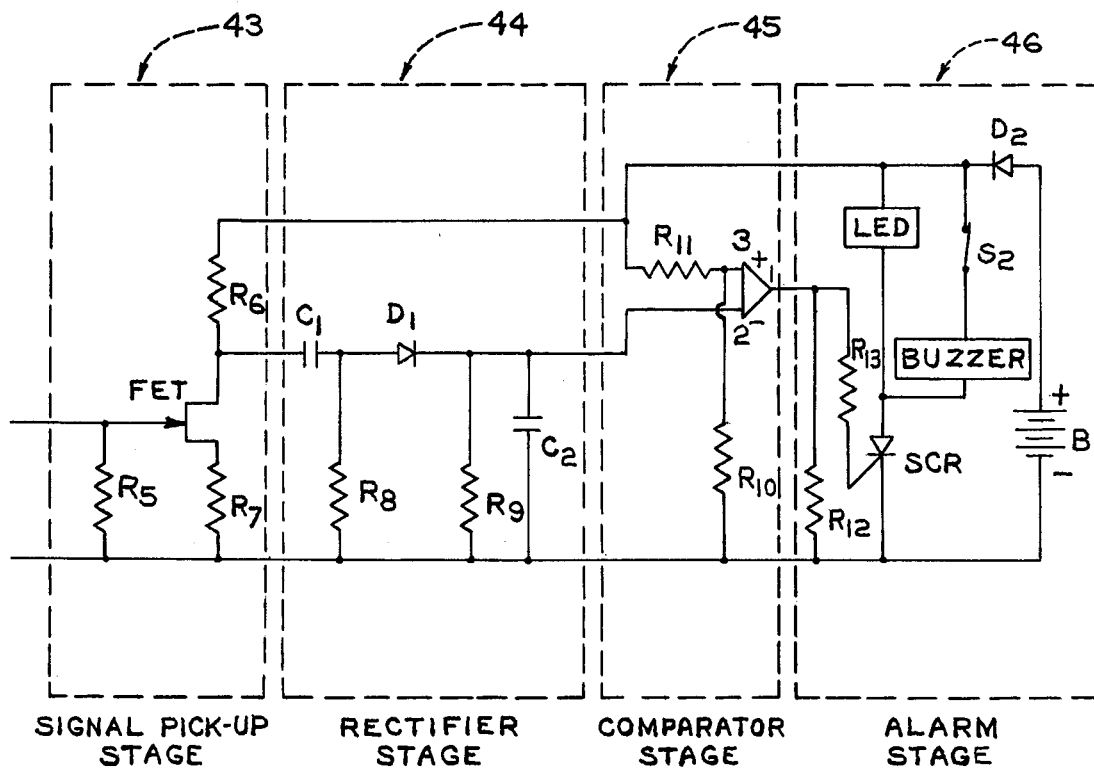
FIG. 7 shows a circuit diagram illustrating an alarm triggering circuit which may be used with the embodiment of the invention shown in FIG. 4.

The alarm triggering circuit 42 may be any alarm circuit responsive to a voltage variation. A suitable alarm circuit is illustrated in FIG. 7 and is composed of a signal pick-up stage 43, a rectifier stage 44, a comparator stage 45, and alarm stage 46. When the pressure in the tire is within a normal operaging pressure, the voltage amplitude ($V_o$) across coil 35 is relatively large. This relatively large amplitude voltage is registered in the signal pick-up stage 43, composed of resistors $R_5$, $R_6$, and $R_7$ and the field effect transistor (FET), and is transferred to the rectifier stage 44, composed of resistors $R_8$ and $R_9$, condensers $C_1$ and $C_2$ and diode $D_1$, which rectifies the signal to a DC voltage of relatively large value that appears as the input to the comparator stage 45, composed of resistors $R_{10}$ and $R_{11}$ and the Operational Amplifier (OP). The comparator stage 45 is adjusted so that a relatively large amplitude value DC voltage input will have a zero output. Thus, since the input to the comparator when pressure switch 34 is "open" is of relatively high level, the small output from the comparator stage 45 is insufficient to "set off" the alarm stage. However, when the pressure in the tire 21 drops below the pressure at which pressure switch 34 "opens," the relatively low amplitude voltage $V_o'$ across coil 35 is registered in the signal pick-up stage 43 producing a small amplitude output signal from the signal pick-up stage 43 that is rectified to a small amplitude DC voltage signal in the rectifier stage 44. The small amplitude DC voltage signal appears as the input signal of the comparator stage 45 and being of small amplitude produces an output signal of the comparator stage of sufficient magnitude to cause the triggering of the alarm stage 46, composed of resistors $R_{12}$ and $R_{13}$, diode $D_2$, a silicon controlled rectifier (SCR), a light emitting diode (LED), a buzzer, switch $S_2$ and the vehicle battery B. Once the alarm stage 46 is triggered, the buzzer will continue to emit a warning signal until the circuitry is broken by manually "opening" switch $S_2$.

Figure 5:
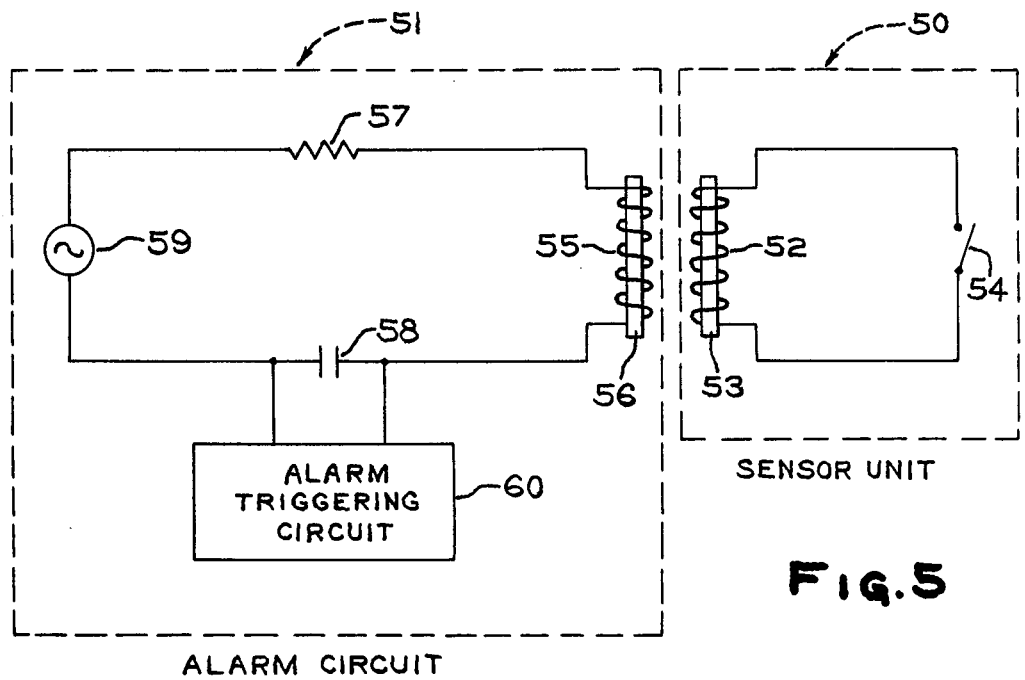
FIG. 5 shows a block diagram of still another embodiment of the invention.

The monitoring system shown in FIG. 5 includes a sensor circuit 50 and an alarm circuit 51. The sensor circuit 50 includes coil 52 wound on core 53 connected in series with pressure switch 54. Pressure switch 54 is a "dual action" pressure switch that is designed to remain "open" as long as the pressure within the tire being monitored stays within a predesigned range (which corresponds to the inflation pressure range of the tire that would be considered as a "normal" tire pressure), but which "closes" if the pressure within the tire drops below the pressure range or increases to a pressure above the pressure range. The alarm circuit 51 includes coil 55 wound on core 56 serially connected to a resistor 57 and condenser 58 which are serially connected with oscillator 59. Alarm triggering circuit 60 (which may consist of circuitry such as that described in U.S. Pat. No. 3,840,850) is connected across the terminals of condenser 58.

Cores 53 and 56, like cores 13 and 16 of the embodiment shown in FIG. 1 and cores 33 and 36 of the embodiment shown in FIG. 4, may be made from either a powdered ferromagnetic material or a powdered ferrimagnetic material.

The sensor circuit 50 is mounted on the wheel to be monitored and may be mounted in the manner shown in FIG. 2 with pressure switch 54 forming a part of the valve assembly and coil 52 wound on core 53 affixed to the wheel rim 24. Coil 55 wound on core 56 is mounted on the vehicle body at a location so that as the wheel rotates coil 52 will pass in close proximity to coil 55 during each rotation of the wheel.

The circuit that includes coil 55 and condenser 58, the "primary circuit," is tuned to electrical resonance at the frequency of the signal emitted by oscillator 59. As explained above in connection with the description of the monitoring systems shown in FIGS. 1 and 4, once a specific condenser 58 has been chosen, the number of turns of wire in coil 55 will need to be selected that will produce the desired condition of electrical resonance at the frequency of the signal generated by oscillator 59. Alternatively, if a specific coil 55 has been selected for use in the system, then a condenser 58 must be chosen that has the capacitance that will produce electrical resonance in the "primary circuit" at the frequency of the signal emitted by oscillator 59.

The number of turns of wire in coil 52 must be selected so that with pressure switch 54 in the "open" position and the "primary circuit" tuned to electrical resonance at the frequency of the signal generated by oscillator 59, the "secondary circuit" (which includes coil 52 and pressure switch 54) is in electrical resonance at the frequency of the signal generated by oscillator 59 as coil 52 passes in close proximity to coil 55 during the rotation of the wheel of the vehicle. The proper number of turns of wire to produce a condition of electrical resonance in the "secondary circuit" can be determined in the manner described above.

During operation of the monitoring system shown in FIG. 5, when the pressure in the tire mounted on the wheel which is being monitored is "normal" (that is, at a pressure within the pressure range at which pressure switch 54 remains "open"), the "secondary circuit" is an open circuit. Since the "primary circuit" in the alarm circuit 51 is tuned to electrical resonance the voltage across coil 55 is of relatively large amplitude until coil 52 passes in close proximity to coil 55 as the wheel rotates. During the short interval when coil 52 passes in close proximity to coil 55, the voltage across coil 55 is significantly reduced. The fluctuation in voltage across coil 55 is signaled to alarm triggering circuit 60 which is designed so that such fluctuation in voltage does not trigger the warning signal. However, when the pressure in the tire on the wheel being monitored drops below the pressure at which pressure switch 54 responds or increases to a pressure above the pressure at which pressure switch 54 responds, pressure switch 54 moves to the closed position. The "secondary circuit" no longer is an "open circuit" and now is not in "matched resonance" with the "primary circuit" of alarm circuit 51 during the short period that coil 52 of the "secondary circuit" passes in close proximity to coil 55 of the "primary circuit." Since the "primary circuit" and "secondary circuit" are not in "matched resonance," there no longer is a noticeable voltage drop across coil 55 during the period that coil 52 passes in close proximity to coil 55 but instead the voltage across coil 55 remains essentially constant and of large amplitude. The lack of significant fluctuation of the voltage across coil 55 as the wheel rotates is communicated to alarm triggering circuit 60. The constant large amplitude voltage communicated to the alarm triggering circuit 60 "sets off" the warning signal to warn the operator of the vehicle of the underinflated condition of the tire.

As is evident from the foregoing description of three embodiments of this invention, the "primary circuit" of the monitoring system of this invention is designed to be tuned to electrical resonance at the frequency at which the monitoring system operates. Also, the ratio of the number of turns of wire in the coil of the "secondary circuit" of the monitoring system to the number of turns of wire in the coil of the "primary circuit" of the monitoring system is selected so that the "secondary circuit" when open circuited is in electrical resonance at the frequency at which the monitoring system operates during the time that the coil of the "secondary circuit" passes in close proximity to the coil of the "primary circuit" as the wheel rotates. The "secondary circuit" of the monitoring system is devoid of any capacitor component, but, instead depends upon the "effective distributed capacitance" characteristic of the coil of the "secondary circuit" when the "secondary circuit" is open circuited to provide the desired resonant condition in the circuit. The monitoring system of the present invention does not require the use of components in the circuitry that might be jolted out of proper "setting" when the vehicle is driven on rough pavements and, thus, is less susceptible to malfunctioning than systems which do require variable type components.

It will be understood that the embodiments of the present invention described above are susceptible to various modifications, changes and adaptations and that the same are intended to be comprehended within the meaning and range of equivalents of the appended claims.

I claim:

1. A system for monitoring the inflation of a tire mounted on the wheel of a vehicle comprising a sensor circuit mounted to rotate with said vehicle wheel and an alarm circuit associated with the vehicle body, said sensor circuit including an inductor coil means wound on a powder core and mounted to rotate with said vehicle wheel and a pressure switch responsive to a change in pressure within said tire from an acceptable pressure to an unacceptable pressure, said pressure switch being in serial electrical connection with said inductor coil means, said alarm circuit including in electrical connection an inductor coil means wound on a powder core, capacitance means, resistor means, oscillator means for generating an alternating current signal of constant frequency and an alarm triggering circuit responsive to a change in the voltage pattern across said second-mentioned inductor coil means occurring when said pressure switch responds to a change in pressure within said tire from an acceptable pressure to an unacceptable pressure, said sensor circuit exhibiting an effective distributed capacitance characteristic at the frequency of the signal generated by said oscillator means with said pressure switch in an open condition and said first-mentioned inductor coil being in relatively close proximity to said second-mentioned inductor coil, said second-mentioned inductor coil means being mounted to said vehicle body at a position so that said first-mentioned inductor coil means mounted with said vehicle wheel passes in close proximity to said second-mentioned inductor coil means during each rotation of said vehicle wheel, said second-mentioned inductor coil means and said capacitance means of said alarm circuit being in a "primary circuit" that is in electrical resonance at the frequency of the signal generated by said oscillator means, said first-mentioned inductor coil means containing a number of turns of wire in the coil to cause said first-mentioned inductor coil means to be in electrical resonance with its said effective distributed capacitance at the frequency of the signal generated by said oscillator means with said pressure switch in the open position and during the time said first-mentioned inductor coil means passes in close proximity to said second-mentioned inductor coil means and to cause the circuit that includes said first-mentioned inductor coil means and said switch means to be in matched resonance with the said "primary circuit" of said alarm circuit when said pressure switch is in the open position and during the time said first-mentioned inductor coil means passes in close proximity to said second-mentioned inductor coil means.

2. A tire inflation monitoring system according to claim 1 wherein said first-mentioned inductor coil means is wound on a core comprised of powdered ferromagnetic material and said second-mentioned inductor coil means is wound on a core comprised of powdered ferromagnetic material.

3. A tire inflation monitoring system according to claim 1 wherein said first-mentioned inductor coil means is wound on a core comprised of powdered ferrimagnetic material and said second-mentioned inductor coil means is wound on a core comprised of powdered ferrimagnetic material.

4. A tire inflation monitoring system according to claim 1 wherein said pressure switch is maintained in the closed position when the pressure within said tire is within the acceptable range and which opens in response to a change in pressure within said tire from a pressure within the acceptable range to an unacceptable tire inflation pressure.

5. A tire inflation monitoring system according to claim 4 wherein the second-mentioned inductor coil means is serially connected with said resistor means and said oscillator means, and said capacitance means is connected across the terminals of the said second-mentioned inductor coil means.

6. A tire inflation monitoring system according to claim 5 wherein said alarm triggering circuit is connected across said resistor means.

7. A tire inflation monitoring system according to claim 5 wherein the first-mentioned inductor coil means is wound on a core comprised of powdered ferrimagnetic material and the second-mentioned inductor coil means is wound on a core comprised of powdered ferrimagnetic material.

8. A tire inflation monitoring system according to claim 4 wherein said capacitance means is a coaxial cable with one terminal of the second-mentioned inductor coil means serially connected to the central conductor of said coaxial cable and the second terminal of said second-mentioned inductor coil means serial connected to the metal tubular conductor of said coaxial cable.

9. A tire inflation monitoring system according to claim 8 wherein the said central conductor of said coaxial cable is serially connected to said resistor means which is serially connected to said oscillator means which is connected to ground and wherein one terminal of said alarm triggering circuit is connected at the juncture of the connection of said central conductor of said coaxial cable with said resistor means and the other terminal of said alarm triggering circuit is connected to ground.

* * * * *